(12) United States Patent
Matsutani et al.

(10) Patent No.: US 7,952,655 B2
(45) Date of Patent: May 31, 2011

(54) DISPLAY DEVICE WITH SECURED SUPPORT ON FRAME

(75) Inventors: Nobuhiro Matsutani, Osaka (JP); Shinichi Kameoka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 415 days.

(21) Appl. No.: 12/136,814

(22) Filed: Jun. 11, 2008

(65) Prior Publication Data

US 2008/0309843 A1    Dec. 18, 2008

(30) Foreign Application Priority Data

Jun. 12, 2007    (JP) .................................. 2007-155564

(51) Int. Cl.
*G02F 1/1333*    (2006.01)
*H05K 5/00*    (2006.01)
*H05K 7/18*    (2006.01)

(52) U.S. Cl. ............ 349/58; 349/60; 361/600; 361/724; 361/730; 361/752; 361/796

(58) Field of Classification Search ............ 349/58, 349/60; 361/681, 752, 600, 714, 724, 730, 361/796, 829

See application file for complete search history.

(56) References Cited

U.S. PATENT DOCUMENTS

| | | | | |
|---|---|---|---|---|
| 6,577,288 | B1 * | 6/2003 | Min ................................ | 345/87 |
| 7,771,105 | B2 * | 8/2010 | Ha et al. ........................ | 362/630 |
| 2002/0080297 | A1 * | 6/2002 | Sung .............................. | 349/58 |
| 2005/0212991 | A1 | 9/2005 | Sugawara | |
| 2006/0082696 | A1 | 4/2006 | Kim | |
| 2010/0253874 | A1 * | 10/2010 | Ito et al. ........................ | 349/58 |

FOREIGN PATENT DOCUMENTS

| | | |
|---|---|---|
| JP | 07-255024 A | 10/1995 |
| JP | 2007-17513 A | 1/2005 |
| WO | WO-2006/090543 A1 | 8/2006 |

* cited by examiner

*Primary Examiner* — Hoan C Nguyen
(74) *Attorney, Agent, or Firm* — Global IP Counselors

(57) ABSTRACT

A display device includes a display module, a rear cabinet and a front cabinet. The front cabinet has a front frame portion, a first rib and a second rib. The front frame portion defines a window. The first rib has a peak ridge. The first rib is integrally formed on the front frame portion, extends along the front frame portion to surround the window and protrudes rearward from the front frame portion so that the peak ridge contacts with a peripheral edge portion of the front face of the display module. The second rib has a flat top face. The second rib is integrally formed on the front frame portion, is located outward of the first rib with respect to the window with a spacing therebetween and protrudes rearward from the front frame portion. The second rib has shorter height than the first rib.

17 Claims, 4 Drawing Sheets

DISPLAY DEVICE WITH SECURED SUPPORT ON FRAME

CROSS-REFERENCE TO RELATED APPLICATIONS

This application claims priority to Japanese Patent Application No. 2007-155564 filed on Jun. 12, 2007. The entire disclosure of Japanese Patent Application No. 2007-155564 is hereby incorporated herein by reference.

BACKGROUND OF THE INVENTION

1. Field of the Invention

The present invention generally relates to a display device. More specifically, the present invention relates to a display device having a display module housed in a cabinet.

2. Background Information

A conventional flat panel display device includes a front cabinet, a rear cabinet and a liquid crystal module. The front and rear cabinets mate together. The liquid crystal module is housed in the front and rear cabinets. The front cabinet has a front face opening, a support rib and a plurality of bosses. The support rib has a substantially square shape in a front elevational view and is integrally provided protruding from a rear face of the front cabinet along the front face opening of the front cabinet. The bosses are formed on the rear face of the front cabinet at locations spaced apart and outward of the support rib. The liquid crystal module has a liquid crystal panel, a bezel and a rear face member. The bezel is provided to an outer peripheral edge section of a front face of the liquid crystal panel. The rear face member protrudes outward from a rear face of the liquid crystal panel.

The assembly procedure will now be described. The liquid crystal panel is inserted into the front cabinet so that the bezel contact with a flat face of the support rib with a planar contact. A plurality of screws are inserted into holes formed on the rear face member and threaded into center holes of the bosses. As a result, the liquid crystal panel is pressed against the flat face of the support rib with a pressing force. This fixes the liquid crystal panel at a specific location within the front and rear cabinets.

The liquid crystal panel displays a video image by illuminating a liquid crystal cell provided to a front part of the liquid crystal panel from a rear side with a cold cathode fluorescent lamp (CCFL). Related technology has been discussed in Japanese Laid-Open Patent Application No. H7-255024.

With the conventional flat panel display device, the flat face of the support rib contacts with the bezel of the liquid crystal module with a planar contact. Thus, if the liquid crystal panel is subjected to impact due to a fall, the support rib receives the impact, and supports the liquid crystal panel so that the liquid crystal panel would not move accidentally from an intended location.

However, since the flat face of the support rib contacts with the bezel of the liquid crystal module with a planar contact, contact width between the bezel and the flat face of the support rib is relatively wide. Thus, the pressing force provided by the screws is dispersed over the entire flat face. Therefore, it is difficult to make the flat face snug all the way around the bezel. Furthermore, there tends to be a gap between the flat face and the bezel. As a result, vibration imparted to the liquid crystal panel by the presence of the gap causes the flat face and the bezel to rub against each other. This creates vibration noise called chatter, which is unpleasant to the user. This also produces a powdery coating. Dust produced by the powdery coating is stuck to the front part of the liquid crystal panel, which lowers the appearance of flat panel display device.

To prevent the generation of vibration noise and eliminate the powdery coating, a nonwoven cloth is affixed to the flat face of the support rib, and the bezel is pressed against the flat face via the nonwoven cloth. However, affixing the nonwoven cloth to the flat face takes extra time and work, and also increases the number of parts required. As a result, production costs are increased.

In view of the above, it will be apparent to those skilled in the art from this disclosure that there exists a need for an improved display device. This invention addresses this need in the art as well as other needs, which will become apparent to those skilled in the art from this disclosure.

SUMMARY OF THE INVENTION

The present invention is conceived in light of the above-mentioned problems. One object of the present invention is to provide a display device with which a display module is securely supported.

In accordance with one aspect of the present invention, a display device includes a display module, a rear cabinet and a front cabinet. The display module is configured to display image. The rear cabinet is disposed on a rear side of the display module. The front cabinet is attached to a front side of the rear cabinet to house the display module. The front cabinet has a front frame portion, a first rib and a second rib. The front frame portion defines a window exposing a part of a front face of the display module. The first rib has a peak ridge. The first rib is integrally formed on the front frame portion, extends along the front frame portion to surround the window and protrudes rearward from the front frame portion so that the peak ridge contacts with a peripheral edge portion of the front face of the display module. The second rib has a flat top face. The second rib is integrally formed on the front frame portion, is located outward of the first rib with respect to the window with a spacing therebetween and protrudes rearward from the front frame portion. The second rib has shorter height than the first rib.

With the display device of the present invention, it is possible to provide a display device with which a display module is securely supported.

These and other objects, features, aspects and advantages of the present invention will become apparent to those skilled in the art from the following detailed descriptions, which, taken in conjunction with the annexed drawings, discloses selected embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from these disclosures that the following descriptions of the selected embodiments of the present invention is provided for illustration only and not for the purpose of limiting the invention as defined by the appended claims and their equivalents.

Figures 1A, 1B:
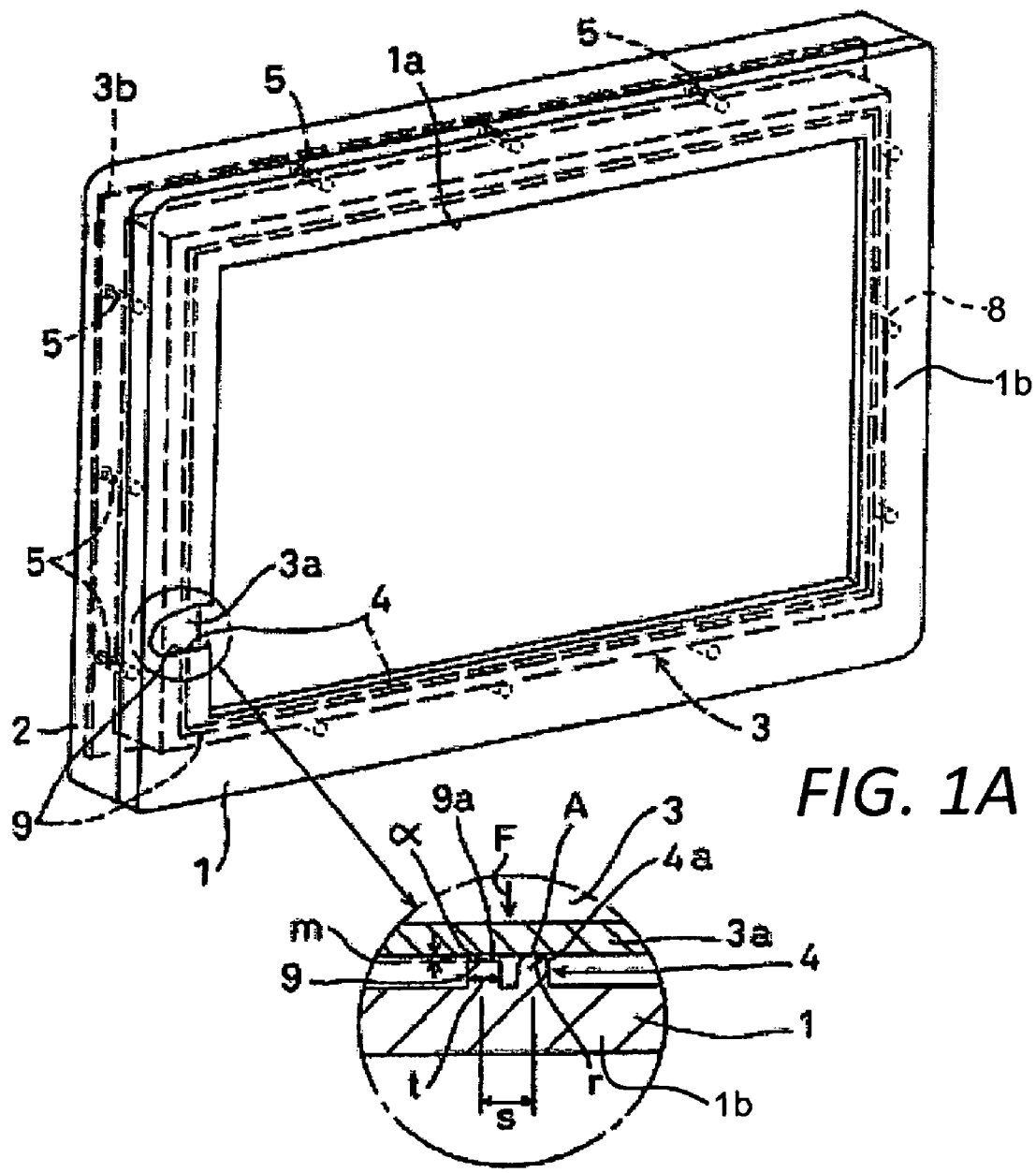
FIG. 1A is a front perspective view of a flat panel display device in accordance with a first embodiment of the present invention.
FIG. 1B is a detail cross sectional view of the flat panel display device illustrated in FIG. 1A.

FIG. 1A is a front perspective view of a flat panel display device (e.g., display device). The flat panel display device is a display device such as an LCD television set, liquid crystal monitor, or the like. The flat panel display device includes a display module, a front cabinet 1 and a rear cabinet 2. The display module includes a liquid crystal panel (e.g., display main body) 3, a bezel 3a and a rear face member 3b. The display module is housed in the front and rear cabinets 1 and 2 that are mated together. The bezel 3a is provided to an outer peripheral edge section of a front face of the liquid crystal panel 3. The rear face member 3b is disposed on a rear side of the liquid crystal panel 3 and protrudes outward of an outer periphery of the liquid crystal panel 3 at the rear side of the liquid crystal panel 3. The rear face member 3b has a plurality of screw insertion holes formed at spaced apart locations along the outer periphery of the liquid crystal panel 3. The liquid crystal panel 3 has liquid crystal cells. The liquid crystal cells are provided to a front part of the liquid crystal panel 3 and illuminated from a rear side with a cold cathode fluorescent lamp (CCFL) (not shown) to display a video image on the liquid crystal panel 3. The rear cabinet 2 is disposed on a rear side of the display module.

As shown in FIGS. 1A to 3, the front cabinet 1 is attached to a front side of the rear cabinet 2 to house the display module. The front cabinet 1 includes a front frame portion 1b, a support rib (e.g., first rib) 4, a plurality of bosses 8 and a retainer rib (e.g., second rib) 9. The front cabinet 1 is integrally formed as a one-piece unitary member. In particular, at least the front frame portion 1b, the support rib 4 and the retainer rib 9 are integrally formed as a one-piece unitary member.

The front frame portion 1b defines a front face opening (e.g., window) 1a inward of the front frame portion 1b. The front face opening 1a exposes a part of the front face of the liquid crystal panel 3. The support rib 4 has a peak ridge with a tapered cross sectional shape having a peak. The peak ridge includes a bezel-opposing face 4a facing the bezel 3a. The support rib 4 is integrally formed on the front frame portion 1b. The support rib 4 extends along the front frame portion 1b to surround the front face opening 1a so that the support rib 4 has an annular shape with a substantially rectangular outer periphery in a front elevational view. In other words, the support rib 4 forms in a continuous annular ring shape. The support rib 4 protrudes rearward from a rear face of the front frame portion 1b so that the bezel-opposing face 4a of the support rib 4 contacts with a peripheral edge portion of the front face of the display module. Specifically, the bezel-opposing face 4a of the support rib 4 contacts with a front face of the bezel 3a. The bezel-opposing face 4a is formed in a tapered shape. Specifically, the bezel-opposing face 4a has a semicircular cross sectional shape with a radius r. A distal end of the bezel-opposing face 4a (linear contact portion A) contacts with the bezel 3a with a linear contact. Furthermore, the distal end of the bezel-opposing face 4a contacts with the bezel 3a at a midpoint (½k) of a total width k from an outer periphery of the bezel 3a to an inner periphery of the bezel 3a.

The bosses 8 are integrally formed on the front frame portion 1a at locations spaced apart along the front frame portion 1a and outward of the support rib 4 with respect to the front face opening 1a. Each of the bosses 8 has a threaded hole at a center of the bosses 8. The screw insertion holes of the rear face member 3b are formed at locations corresponding to the threaded holes of the bosses 8. A plurality of screws 5 are inserted through the screw insertion holes of the rear face member 3b and threaded into the threaded holes of the bosses 8 to fix the display module to the front cabinet 1. As a result, the liquid crystal panel 3 of the display module is pressed against the support rib 4 of the front cabinet 1.

The retainer rib 9 has a flat top face 9a having a specific width t. The retainer rib 9 is integrally formed on the front frame portion 1b at a location outward of the support rib 4 with respect to the front face opening 1a with a spacing between the support rib 4 and the retainer rib 9. The retainer rib 9 extends along the front frame portion 1b to surround the front face opening 1a so that the retainer rib 9 has an annular shape with a substantially rectangular outer periphery in a front elevational view. In other words, the retainer rib 9 forms in a continuous annular ring shape. The retainer rib 9 protrudes rearward from the rear face of the front frame portion 1b. The retainer rib 9 is located between the support rib 4 and the bosses 8 at a location closer to the support rib 4 than the bosses 8. The retainer rib 9 has shorter height than the support rib 4. Therefore, the flat top face 9a faces the bezel 3a with a narrow gap α therebetween. The flat top face 9a is disposed in parallel to the bezel 3a.

An example of specific dimensions will be given. In FIG. 1, the radius r of the bezel-opposing face 4a of the support rib 4 is 1 mm. The spacing s between centers of the support rib 4 and the retainer rib 9 is 3 mm. The width t of the flat top face 9a of the retainer rib 9 is 2 mm. The gap α between the bezel 3a and the flat top face 9a of the retainer rib 9 (or a height difference between the support rib 4 and the retainer rib 9) has a predetermined width m in a range of 0.1 to 0.3 mm (and preferably a range of 0.15 to 0.25 mm). More specifically, the width m of the gap α is 0.2 mm. Furthermore, in FIG. 3, the width k of the bezel 3a is 20 mm.

The assembly procedure will now be described. The liquid crystal panel 3 is inserted into the front cabinet 1 so that the bezel 3a contacts with the bezel-opposing face 4a of the support rib 4 with a planar contact. The screws 5 are inserted through the screw insertion holes of the rear face member 3b and threaded into the threaded holes of the bosses 8 to fix the display module at a specific location within the front cabinet 1. As a result, the liquid crystal panel 3 of the display module is pressed against the support rib 4 of the front cabinet 1 with a pressing force F. Then, the rear cabinet 2 is attached to the front cabinet 1 to house the display module within the front and rear cabinets 1 and 2.

If the width m of the gap α is less than 0.1 mm, then dimensional error and so forth can result in a state in which the bezel 3a of the display module contacts with the flat top face 9a of the retainer rib 9 from the outset. If this happens, then vibration imparted to the liquid crystal panel 3 can cause the flat top face 9a of the retainer rib 9 and the bezel 3a to rub against each other and generate vibration noise known as chatter, which is unpleasant to the user. Also, a powdery coating can also be produced, which will adhere to a surface of the liquid crystal panel 3 and lower the appearance of the flat panel display device.

If the width m of the gap α is greater than 0.3 mm, the liquid crystal panel 3 can not be supported as intended when the liquid crystal panel 3 is subjected to impact due to a fall, for example. Specifically, the impact can cause the linear contact portion A of the bezel-opposing face 4a of the support rib 4 to be pressed down by the bezel 3a of the liquid crystal panel 3. However, the bezel 3a of the liquid crystal panel 3 will not hit the flat top face 9a of the retainer rib 9. Thus, the impact will be concentrated in the support rib 4. As a result, the support rib 4 will be damaged or deformed and will no longer be able to support the liquid crystal panel 3 as intended.

With the flat panel display device, the width m of the gap α is set to between 0.1 and 0.3 mm (and preferably between 0.15 and 0.25 mm). As shown in FIG. 1, the flat top face 9a of the retainer rib 9 usually does not touch the bezel 3a of the liquid crystal panel 3. The bezel-opposing face 4a of the support rib 4 contacts with the bezel 3a all the way around in a state of linear contact, and the pressing force F is concentrated in the linear contact portion A. As a result, the bezel-opposing face 4a of the support rib 4 fits snugly against the bezel 3a all the way around. Therefore, no vibration noise known as chatter will be generated between the bezel 3a and the bezel-opposing face 4a by vibration imparted to the liquid crystal panel 3. Thus, the display module is securely supported, and a quieter and more pleasant environment is created for the user. Moreover, the dust produced by powdery coatings in the past will not adhere to the surface of the liquid crystal panel 3. Thus, the appearance of the flat panel display device can be kept in a good condition for a longer time.

Figure 4:
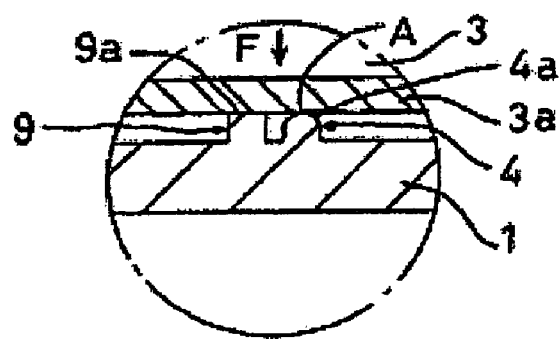
FIG. 4 is a detail cross sectional view of the flat panel display device illustrating a state of receiving a fall impact.

Also, as shown in FIG. 4, if the liquid crystal panel 3 is subjected to impact due to a fall, for example, then the linear contact portion A of the bezel-opposing face 4a of the support rib 4 is pressed down by the bezel 3a of the display module due to the impact. Then, the bezel 3a hits the flat top face 9a of the retainer rib 9 that is adjacent to the support rib 4, and receives the impact. Thus, the liquid crystal panel 3 can be reliably and securely supported so that the liquid crystal panel 3 does not move accidentally from the intended location.

Figure 2:
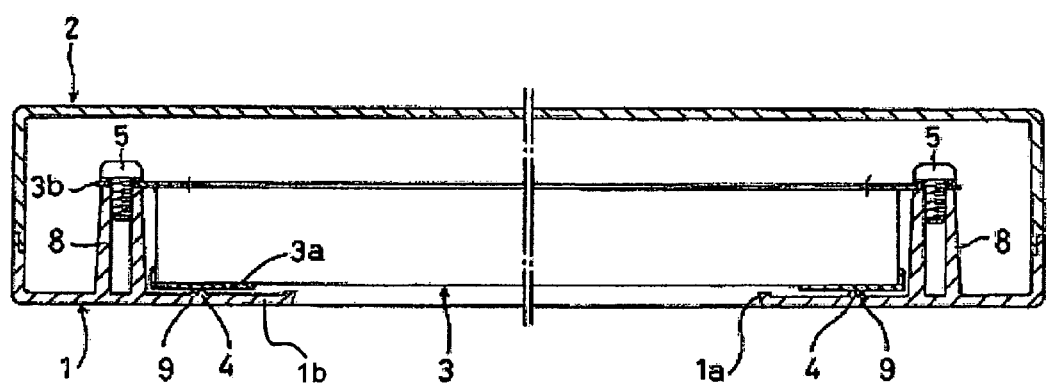
FIG. 2 is a transverse cross sectional view of the flat panel display device illustrated in FIG. 1A.
Figure 3:
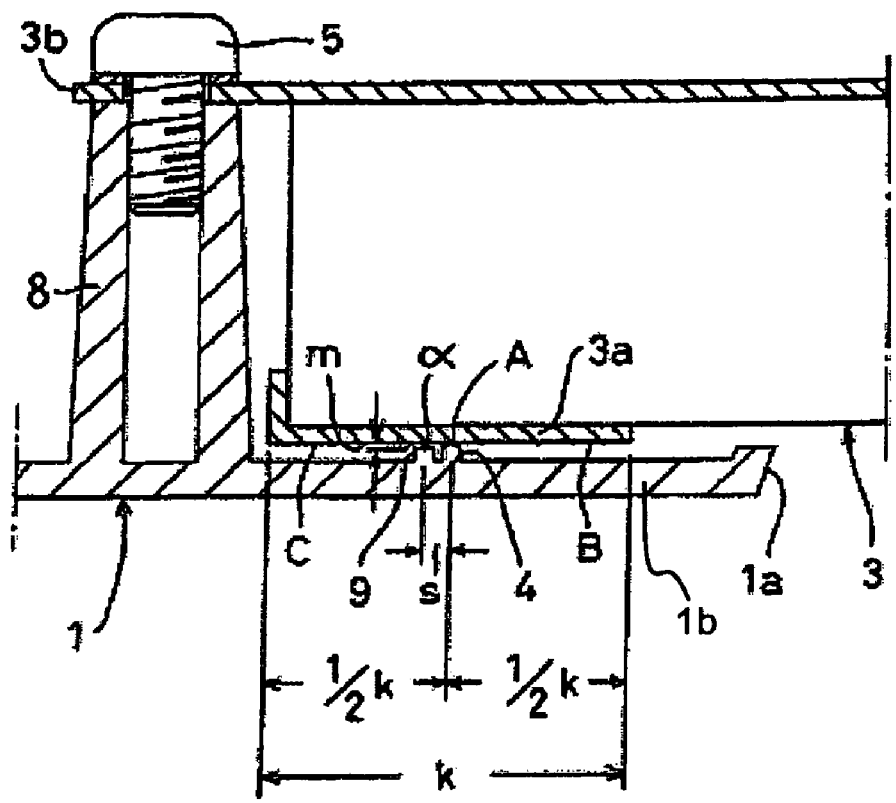
FIG. 3 is a partial cross sectional view of the flat panel display device illustrated in FIG. 1A.

As shown in FIGS. 2 and 3, the liquid crystal panel 3 is pressed against and fixed to the support rib 4 by threading the screws 5 into the threaded holes of the bosses 8. Furthermore, the retainer rib 9 is located between the support rib 4 and the bosses 8 to which the display module is fixed. Thus, the width m of the gap α between the retainer rib 9 and the bezel 3a can be precisely set as intended.

Also, the spacing s between the centers of the support rib 4 and the retainer rib 9 is set extremely small. Furthermore, the retainer rib 9 is located close to the support rib 4. Thus, when the linear contact portion A of the bezel-opposing face 4a of the support rib 4 is pressed down by the bezel 3a under impact due to falling, for example, the retainer rib 9 immediately receives the impact as shown in FIG. 4. As a result, the liquid crystal panel 3 can be reliably held down so that the liquid crystal panel 3 does not move accidentally from the intended location.

When the support rib 4 is pressed against an inner edge B or an outer edge C away from the center of the bezel 3a, there is a risk that the pressing force will deform the bezel 3a. Furthermore, the liquid crystal panel 3 will be subjected to a local load due to the deformation of the bezel 3a, and this load will produce color unevenness on the liquid crystal panel 3. However, with the flat panel display device, the support rib 4 is pressed against the center (½k) of the total width k of the bezel 3a. Thus, the pressing force is applied uniformly over the entire bezel 3a. As a result, the bezel 3a is not deformed. Thus, the liquid crystal panel 3 remains in a sharp display state, without causing color unevenness.

With the flat panel display device, an LCD television set or a liquid crystal monitor is provided with which generation of vibration noise and powdery coatings can be eliminated. Furthermore, the flat panel display device can effectively withstand a fall impact with an inexpensive structure.

The shape of the support rib 4 is not limited to the above-mentioned shape. Various shapes can be employed as shown in FIG. 5.

Figure 5:
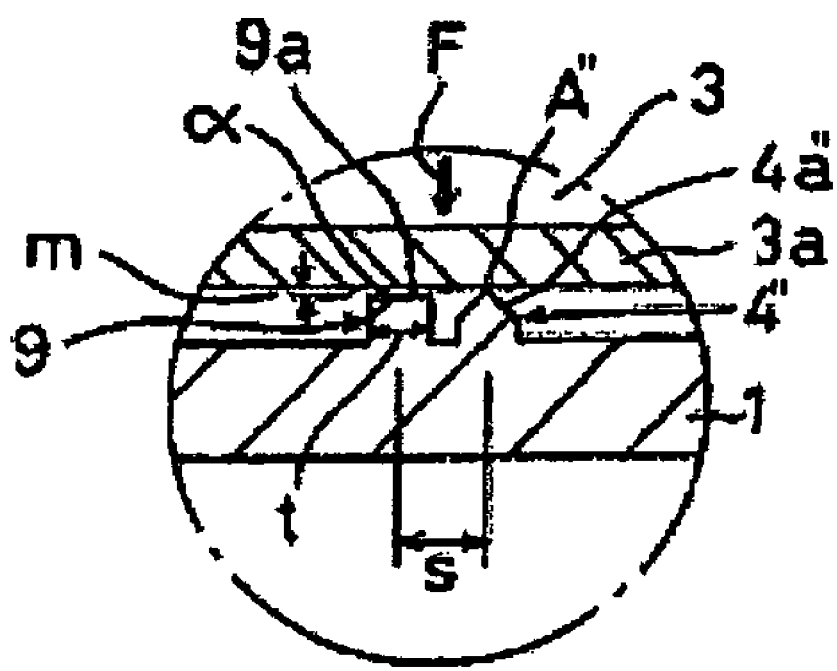
FIG. 5 is a detail cross sectional view of a flat panel display device in accordance with a second embodiment of the present invention.

FIG. 5 is a detail cross sectional view of the support rib 4 in accordance with a second embodiment of the present invention. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The distal end of the support rib 4" is formed in a pointed shape. The bezel-opposing face 4a" of the support rib 4" is a tapering roof-shaped face. As a result, the linear contact portion A" that is the distal end of the bezel-opposing face 4a" contacts with the bezel 3a with a linear contact. The action and effect are substantially the same as with the configuration shown in FIGS. 1 to 4.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a display device equipped with the present invention. Accordingly, these terms, as utilized to describe the present invention should be interpreted relative to a display device equipped with the present invention as used in the normal operating position.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. A display device comprising:
   a display module configured to display image;
   a rear cabinet disposed on a rear side of the display module; and
   a front cabinet attached to a front side of the rear cabinet to house the display module, the front cabinet having
      a front frame portion with a window exposing a part of a front face of the display module,
      a first rib with a peak ridge, integrally formed on the front frame portion, extending along the front frame portion to surround the window and protruding rearward from the front frame portion so that the peak ridge contacts with a peripheral edge portion of the front face of the display module, the first rib being outwardly spaced from an edge of the front frame portion defining the window with a spacing between the first rib and the edge of the front frame portion, and a second rib with a flat top face, integrally formed on the front frame portion, located outward of the first rib with respect to the window with a spacing therebetween and protruding rearward from the front frame portion, the second rib having shorter height than the first rib.

2. The display device according to claim 1, wherein the peak ridge of the first rib contacts with the display module with a linear contact.

3. The display device according to claim 1, wherein the first rib has an annular shape with a substantially rectangular outer periphery.

4. The display device according to claim 1, wherein the second rib has an annular shape with a substantially rectangular outer periphery.

5. A display device comprising:
a display module configured to display image;
a rear cabinet disposed on a rear side of the display module; and
a front cabinet attached to a front side of the rear cabinet to house the display module, the front cabinet having
   a front frame portion defining a window exposing a part of a front face of the display module,
   a first rib with a peak ridge, integrally formed on the front frame portion, extending along the front frame portion to surround the window and protruding rearward from the front frame portion so that the peak ridge contacts with a peripheral edge portion of the front face of the display module,
   a second rib with a flat top face, integrally formed on the front frame portion, located outward of the first rib with respect to the window with a spacing therebetween and protruding rearward from the front frame portion, the second rib having shorter height than the first rib, and
   a plurality of bosses integrally formed on the front frame portion at locations spaced apart along the front frame portion and outward of the first rib with respect to the window,
the display module having
   a display main body configured to display the image,
   a bezel provided to a peripheral edge section of a front face of the display main body and contacting the first rib, and
   a rear face member disposed on a rear side of the display main body and protruding outward of an outer periphery of the display main body so that the rear face member faces the bosses, the rear face member having a plurality of screw insertion holes at locations corresponding to the bosses and being fixed to the bosses with a plurality of screws so that the display module is pressed against the first rib.

6. The display device according to claim 5, wherein the flat top face of the second rib faces the bezel of the display module with a gap therebetween.

7. The display device according to claim 6, wherein the gap has a predetermined width in a range of 0.1 to 0.3 mm.

8. The display device according to claim 7, wherein the gap preferably has a predetermined width in a range of 0.15 to 0.25 mm.

9. The display device according to claim 7, wherein the second rib is formed between the first rib and the bosses at a location closer to the first rib than the bosses.

10. The display device according to claim 7, wherein the peak ridge contacts with the bezel at a midpoint of an outer periphery of the bezel and an inner periphery of the bezel.

11. The display device according to claim 7, wherein the display main body includes a liquid crystal panel.

12. The display device according to claim 5, wherein the second rib is formed between the first rib and the bosses at a location closer to the first rib than the bosses.

13. The display device according to claim 5, wherein the peak ridge contacts with the bezel at a midpoint of an outer periphery of the bezel and an inner periphery of the bezel.

14. The display device according to claim 13, wherein the display main body includes a liquid crystal panel.

15. The display device according to claim 12, wherein the peak ridge contacts with the bezel at a midpoint of an outer periphery of the bezel and an inner periphery of the bezel.

16. The display device according to claim 12, wherein the display main body includes a liquid crystal panel.

17. The display device according to claim 5, wherein the display main body includes a liquid crystal panel.

* * * * *